United States Patent [19]

Schad

[11] 4,422,995

[45] Dec. 27, 1983

[54] METHOD AND APPARATUS FOR MOLDING HOLLOW, SLENDER WORKPIECES

[75] Inventor: Robert D. Schad, Toronto, Canada

[73] Assignee: Husky Injection Molding Systems Ltd., Bolton, Canada

[21] Appl. No.: 327,900

[22] Filed: Dec. 7, 1981

[51] Int. Cl.³ .................. B29C 5/00; B29D 23/08; B29F 1/022
[52] U.S. Cl. .................. 264/250; 264/259; 264/328.1; 249/122; 425/112; 425/116; 425/127; 425/129 R; 425/190; 425/577
[58] Field of Search .................. 425/90, 96, 103, 110, 425/116, 125, 126 R, 112, 116, 117, 112, 121, 127, 129 R, 542, 190, 577; 264/255, 250, 513; 249/122, 123, 142

[56] References Cited

U.S. PATENT DOCUMENTS

| | | | |
|---|---|---|---|
| 3,375,552 | 4/1968 | Beck | 425/125 |
| 3,947,176 | 3/1976 | Rainville | 425/130 |
| 4,295,811 | 10/1981 | Sauer | 425/126 R |
| 4,347,209 | 8/1982 | Suzuki | 264/255 |

Primary Examiner—Willard E. Hoag
Attorney, Agent, or Firm—Karl F. Ross

[57] ABSTRACT

There is provided a method for injection-molding an elongate hollow workpiece about a central core. A first quantity of plastic is injected into a first mold cavity through which part of the core extends, to form a spacer element around the core. After the spacer element has hardened, the core and spacer element are transferred to a second mold cavity in which the spacer element holds the core separated from the walls, thereby supporting it against lateral movement. Then, a second quantity of plastic is injected into the second mold cavity to complete the workpiece.

20 Claims, 23 Drawing Figures

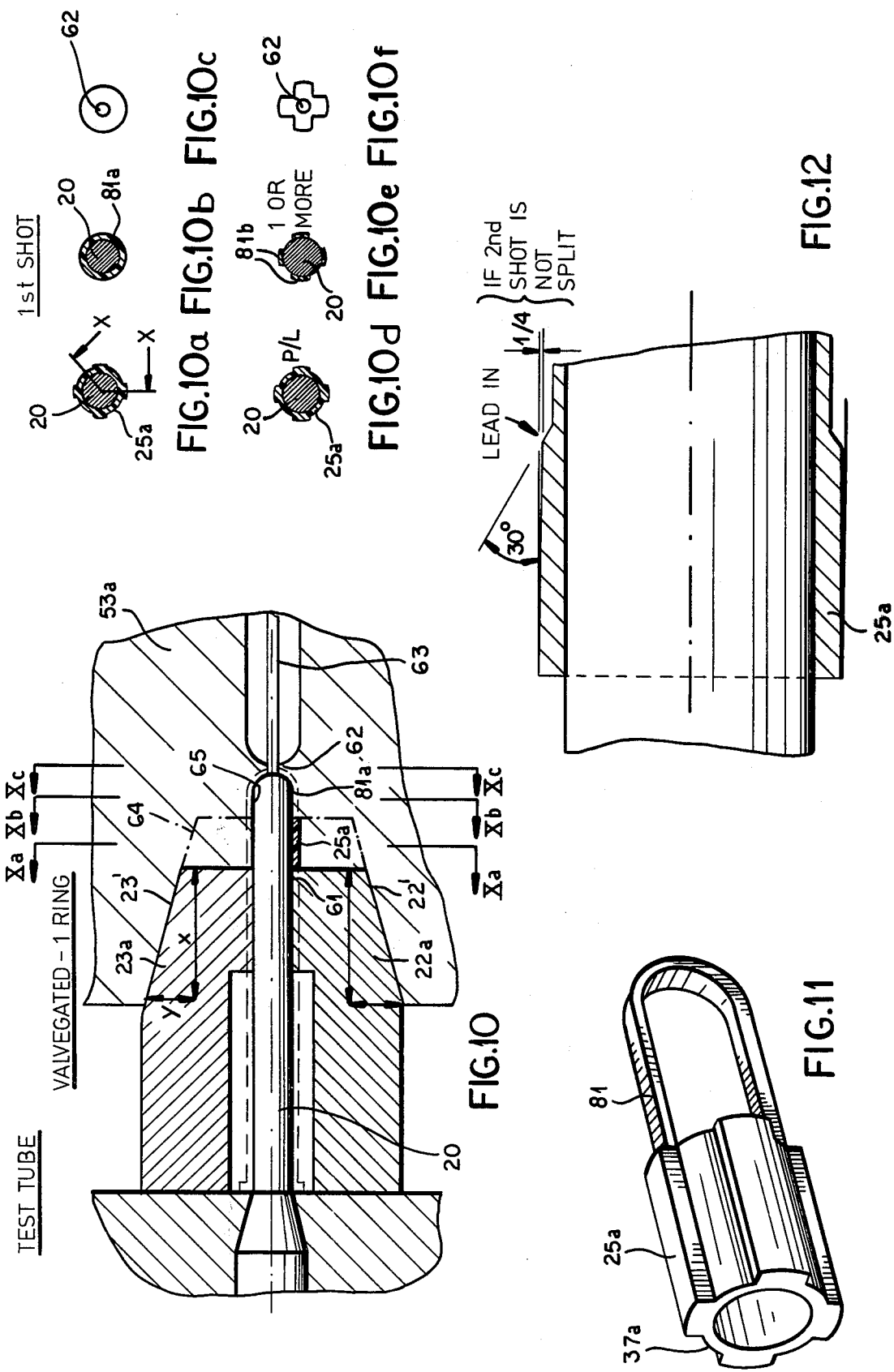

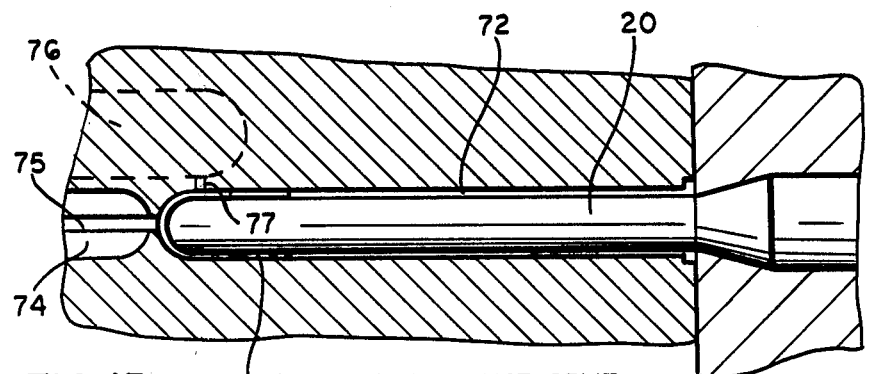
FIG.15  2nd SHOT NOT SPLIT
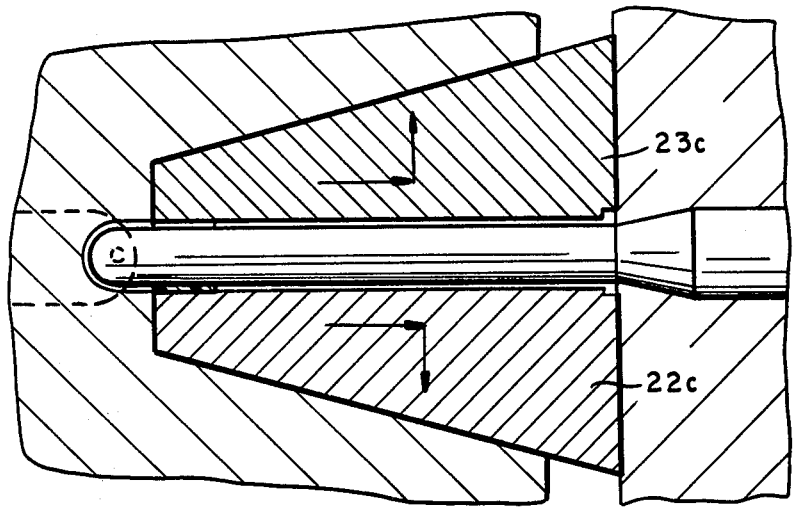
FIG.16  2nd SHOT SPLIT CAVITIES
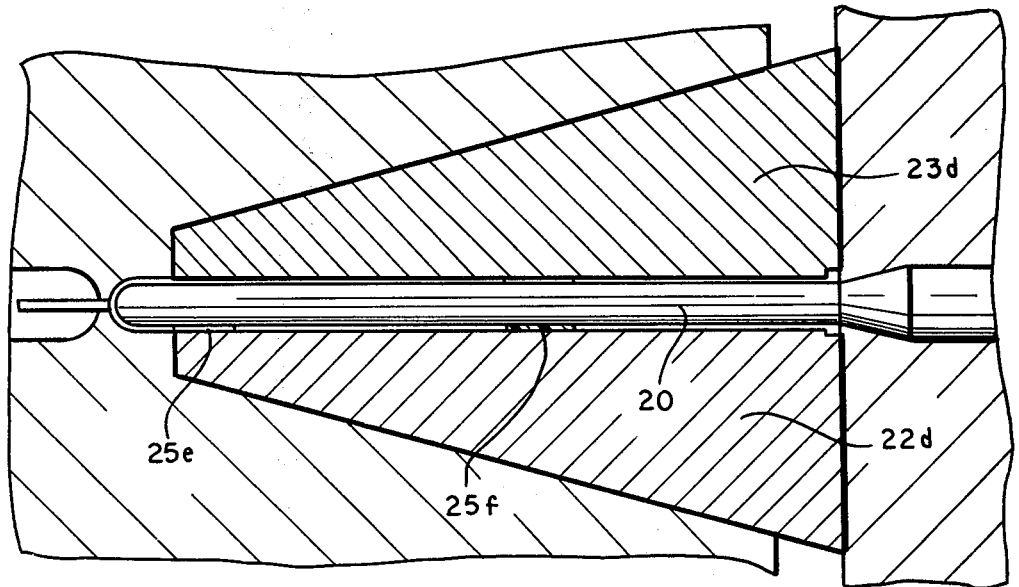
FIG.17

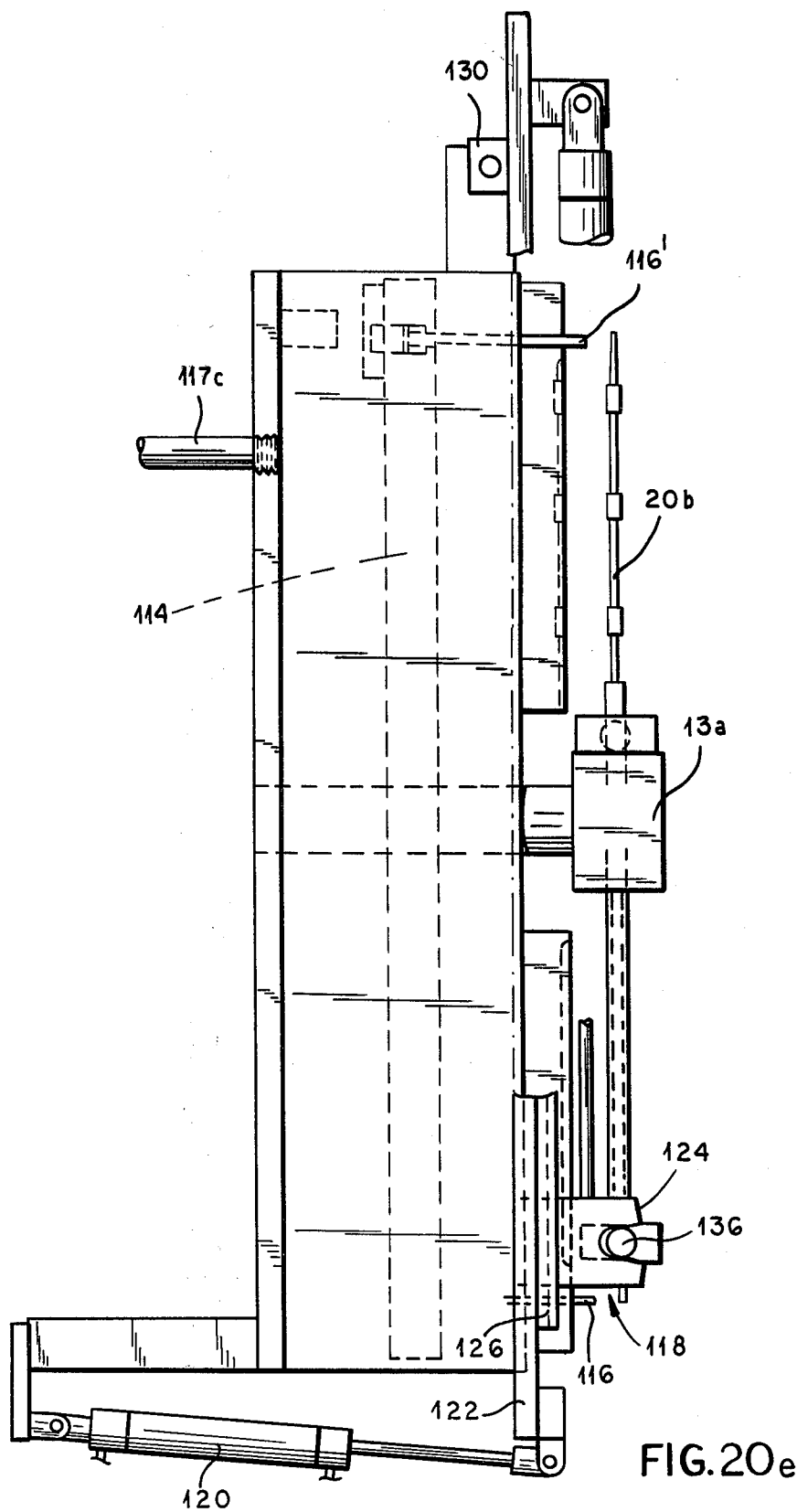

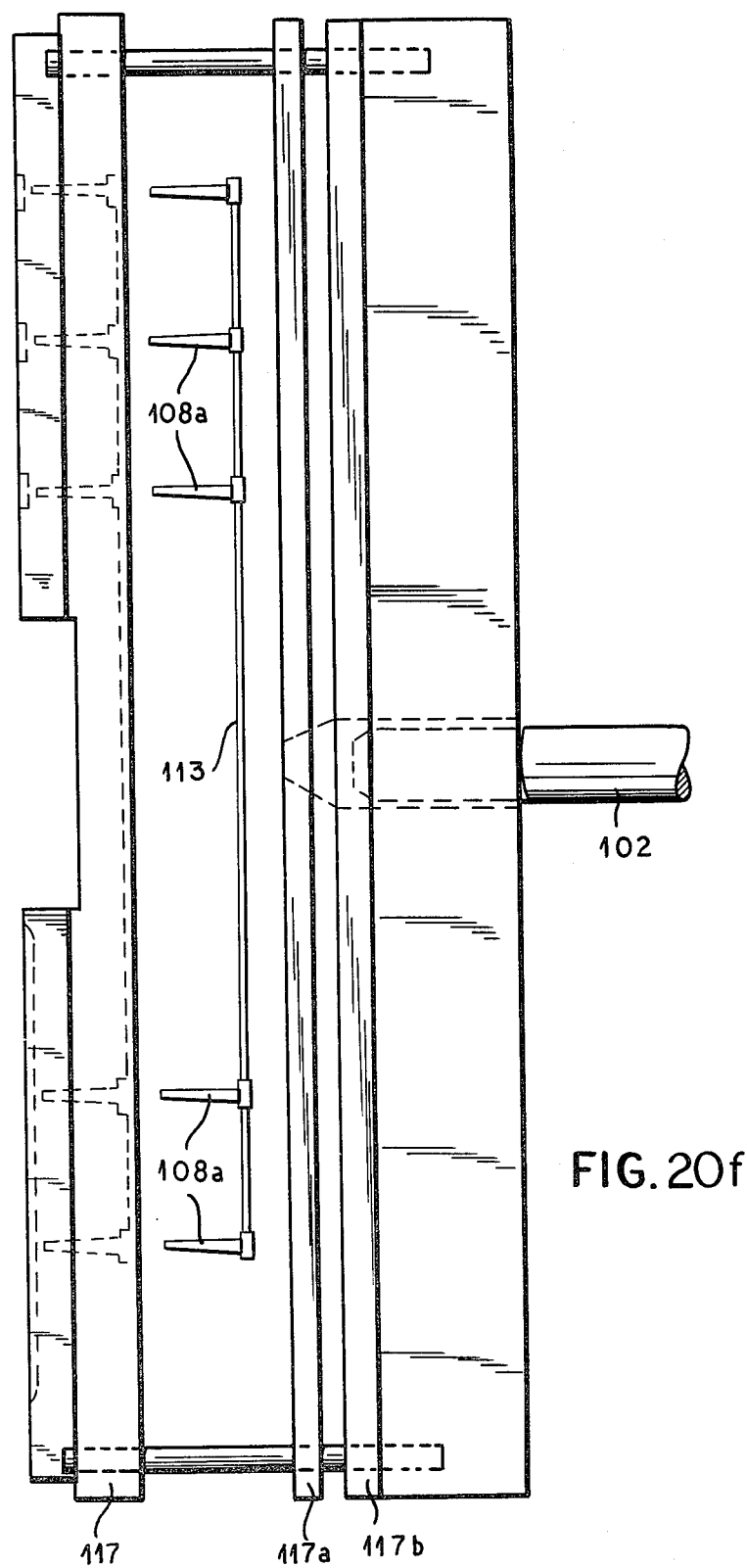

METHOD AND APPARATUS FOR MOLDING HOLLOW, SLENDER WORKPIECES

FIELD OF THE INVENTION

My present invention relates generally to a method and an apparatus for molding hollow, slender workpieces such as test tubes, pipettes and the like, and has to do particularly with a method and an apparatus designed to overcome the problems which arise when the central core (defining the internal surface of the workpiece to be molded) is shifted or displaced by the high pressure of the injected plastic during the injection process.

BACKGROUND OF THE INVENTION

Special problems are presented by the injection molding of elongated, slender workpieces, i.e. hollow items such as vials, test tubes, pipettes and the like, where the ratio of the inside diameter to the length is greater than 2:1. The core which forms the inside of these articles is usually supported at its base by a core plate (and an ejector plate) and typically extends cantilever fashion into the cavity defining the outer surface of the workpiece to be molded.

In cases where the molded workpiece has an opening on both ends (for example, a pipette or an open-ended tube), the small end of the core is typically supported on the cavity wall. However, especially in the case of a pipette, the cross-section of the core supported by the cavity wall is quite small, and therefore the core is usually too weak to offer any substantial resistance to the high injection pressure required to fill the mold cavity in the course of injection. As a result, the core will tend to be laterally displaced.

During the injection process, the forces tending to dislocate the core from its central position coaxial with the cavity depend upon the injection pressures used. The thinner the wall of the article, the higher are the pressures which are required to fill the cavity in a desired minimum molding cycle. Even under ideal flow conditions, with the filling taking place from the center of the cavity (opposite the core tip), a very slight uneven flow of plastic into the gap between the cavity wall and the core will often result and will start to deflect the core to one side. This increases the uneven condition and results in an even greater unbalance in the flow. This procedure may ultimately push the core completely toward and against the wall of the cavity, and thereby create an unusable workpiece. While the latter example may represent an extreme case, it is true that some coreshift takes place in all such molds. Vial molds can be filled, with fairly good success, with use of a central gate. Under ideal operating conditions, the coreshift can be held down to an acceptable range of uneven wall thicknesses compatible with quality requirements. Tubular workpieces such as pipettes cannot be center-gated for obvious reasons. Any eccentric gating would cause the plastic flow to generate very large side forces on the core and thus create excessive coreshift.

In cases of this kind, the workpieces can be side-gated near the open end of the tube (i.e. near the support of the core, preferably with two or more gates evenly spaced around the circumference). This method is now commonly used for pipettes, hypodermics, and other articles with a small opening in the top end, and also for test tubes with a slenderness ratio of more than 3:1. In this process, the plastic entering the cavity acts on the core near its base, where it is well supported, and then flows up toward the tip. The plastic flow forms a supporting wall between the core and the cavity wall, helping to sustain the core centrally. The coreshift is thereby held to a minimum. The disadvantage of this method is the need for a cold-runner system, i.e. a system of plastic-flow channels which must be filled with every shot (injection cycle) to bring the plastic to the cavity. This requires an injection capacity in excess of that which would be required if only the volume defining the workpieces had to be filled. It also requires higher pressures to make up for the flow losses in such a system. Worst of all, considerably more injection-cycle time is needed to permit the runner system to cool before ejection. Typically, a workpiece would be ready to eject in about 6 to 8 seconds, whereas an adequately sized runner would need at least 15 to 20 seconds to be solid enough for ejection. Such runners, after ejection, can be reground and reused, but in some cases they must be scrapped on account of the deterioration of the material during the injection cycle which may impair the physical properties of the material. Another disadvantage of the gating at the base of the core is that the plastic, as it flows toward the tip, will compress the air present inside the cavity. Careful venting is required to release this trapped air, as otherwise the cavity space defining the workpieces will not be filled completely at the tip of the core. This venting, however, sometimes presents considerable difficulties and also leaves marks on the workpieces.

By comparison, in systems which permit injection near the tip, "hot-runner" molding is possible, i.e. the runner is never cooled down. The gate, which is the orifice by which the plastic enters the cavity, in some instances freezes sufficiently during mold-open time to prevent leaking of plastic and will be opened again by the injection pressure during the next cycle; alternatively, a mechanical valve stops the flow after every injection cycle (valve gate). Such a hot-runner molding system has the following advantages over the previously described method:

(1) Only the workpieces are molded but not the runners.
(2) A higher molding speed is permitted. The cycle is determined only by the wall cross-section of the molded workpiece and the efficiency of mold cooling.
(3) No regrinding is needed and no material losses are encountered.
(4) There are no venting problems.

One notable attempt has been made to solve this difficulty by surrounding the core with a sleeve which reaches far up into the cavity near the gate at the tip of the workpiece. The sleeve is guided by both the cavity wall and the core and, during injection, is pushed toward the open end of the molded workpiece by the molten plastic entering the cavity. While this system would appear to provide a solution for the problem of core support during injection, the technical difficulties associated therewith are very serious and, as far as is presently known to me, have never been solved.

It has also been proposed to steady the core near its tip by a spring-loaded support which holds the core centered until the plastic pressure pushes the support out of the way.

The disadvantages associated with the last-mentioned solution relate to the fact that the forces available are very small and give only marginal support. Moreover, any device with sliding parts and springs inside the mold cavity is subject to wear, sticking and/or leaking. Such a process would also result in the marking of the molded workpieces at the location of the supports.

U.S. Pat. Nos. 3,301,928 and 4,128,381 are representative of the prior-art solutions described above.

OBJECT OF THE INVENTION

The object of my present invention, therefore, is to provide an improved method of injection-molding hollow articles of the character referred to, along with an apparatus for carrying out this method.

SUMMARY OF THE INVENTION

In accordance with my present invention, an elongate core having one end fixedly secured to a support—preferably a turret as more fully described hereinafter—is introduced into a first mold portion which has clamping surfaces or jaws engageable with the core, this mold portion defining at least one annular first-shot cavity with one or more peripheral discontinuities encircling the core in the vicinity of a free end thereof when the jaws are closed around it. With the core thus clamped in position, plastic material is injected into the first-shot cavity to form a generally annular spacer with one or more peripheral recesses corresponding to the aforementioned discontinuity or discontinuities. Upon subsequent disengagement of the jaws from the core, and hardening of the spacer into a solid ring or band capable of steadying the free end of the slender core, the latter is introduced into a second mold portion with a second-shot cavity exceeding the first-shot cavity in length. The spacer divides this second-shot cavity into one section surrounding the free end of the core and another section communicating therewith via the peripheral recess or recesses to form one or more flow channels through which plastic material, injected into the first-mentioned section of this cavity, can pass into the remainder thereof. The plastic material so injected is then allowed to harden around the core into a finished workpiece which incorporates the spacer and is subsequently stripped from the core.

If the first mold portion has two separable halves completely defining the first-shot cavity in the vicinity of the free core end, the first injection can take place through a supply channel in one of the two mold halves terminating at that cavity. In some instances, however, it will be convenient to supplement these separable mold halves with a unitary block partly bounding this cavity while forming a socket designed to receive the tip of the core, the injection channel then terminating at that socket. If the injection channel opens into the socket via a gate located at a vertex thereof, i.e., at a point on the core axis confronting the free end of the core, the gate should communicate with the first-shot cavity by way of a passage open toward the core but offset from the peripheral discontinuity or discontinuities of that cavity so as to form one or more runners which will not obstruct the corresponding peripheral recess or recesses upon introduction of the core with the spacer and the runner or runners into the second-shot cavity. If the separable mold halves jointly define another first-shot cavity similar to but longitudinally spaced from the one referred to above, the two first-shot cavities should be linked with each other by a runner channel in at least one mold half which is open toward the core and enables the filling of the other cavity while the core is being clamped in the first mold portion.

As will become apparent hereinafter, the passage defined by the socket for the first injection may be a depression of limited width and depth, or several such depressions which could be aligned with corresponding recess-forming discontinuities but have a lesser outer radius. These depressions could be merged into an all-around shallow clearance of similarly reduced outer radius to form a runner in the shape of a thin-walled end cap.

When both mold portions are provided with separable mold halves, these halves can be mounted on two relatively displaceable carriers so as to enable the alternate positioning of the core between the halves of the first and the second mold portion. In this instance, in which the core support is movable between two injection positions, the means for introducing plastic material into the first-shot and the second-shot cavity preferably comprise respective branches of a common runner system. With the movable support designed as a turret also carrying another core, each core can be introduced into one of the cavities for simultaneous formation of a spacer on one core and a finished workpiece on the other core. In practice, as described hereinafter, there will be two sets of cores on opposite sides of the turret coacting with respective sets of first-shot and second-shot cavities.

BRIEF DESCRIPTION OF THE DRAWING

The above and other features of my invention will now be described in detail with reference to the accompanying drawing in which:

FIG. 10 shows an alternative structure for the first mold cavity of the machine of FIG. 6, using a valve pin;

FIGS. 10a, 10b and 10c show sections respectively taken on lines Xa—Xa, Xb—Xb and Xc—Xc of FIG. 10, illustrating an embodiment of a spacer element;

FIGS. 10d, 10e and 10f are sectional views similar to FIGS. 10a—10c, respectively, but show a different configuration of the spacer element;

FIG. 11 is a perspective view of a further modified spacer element;

FIG. 12 is a partial longitudinal sectional view of the spacer shown in FIG. 11, drawn to a larger scale;

FIG. 15 is a longitudinal sectional view of a mold structure in which a mold defining a second-shot cavity does not split;

FIG. 16 shows an arrangement similar to that of FIG. 15 but using a split cavity;

FIG. 17 shows an arrangement similar to that of FIG. 16 but with two spacer elements;

FIG. 20b is an elevational view of the structure shown in FIG. 20a;

FIG. 20e is an elevational view of the ejection side of the mold of FIGS. 20a to 20d in its open position; and FIG. 20f is an elevational view of the injection side of the same mold in its open position.

DETAILED DESCRIPTION

Figure 1:
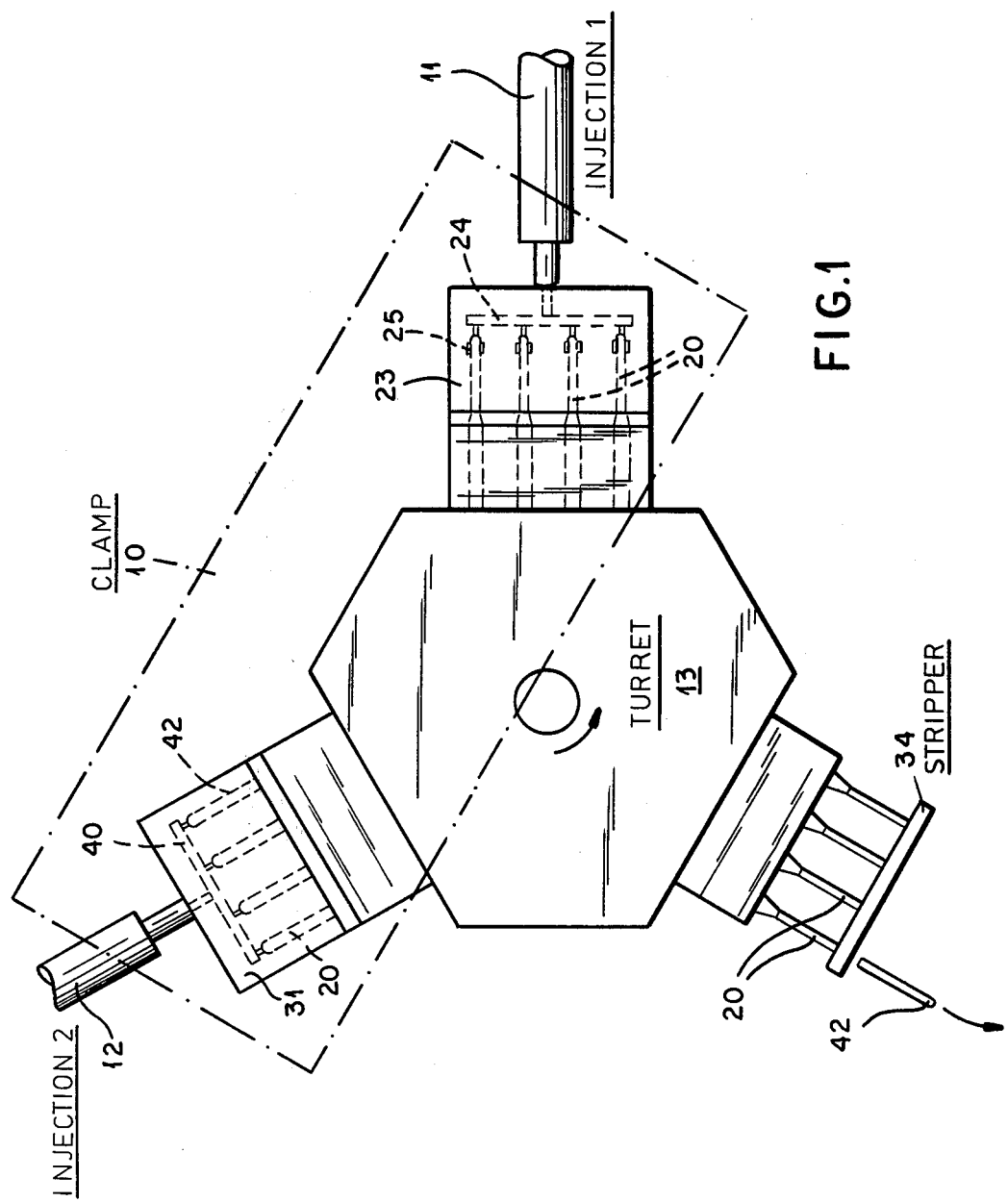
FIG. 1 is a plan view of an apparatus adapted to carry out the method of this invention.

FIG. 1 shows an assembly including a vertical clamp 10, having two injection systems 11 and 12, and a rotating core carrier or turret 13 supporting three sets of cores 20. As can be seen, each set comprises four parallel and aligned cores.

Figure 2:
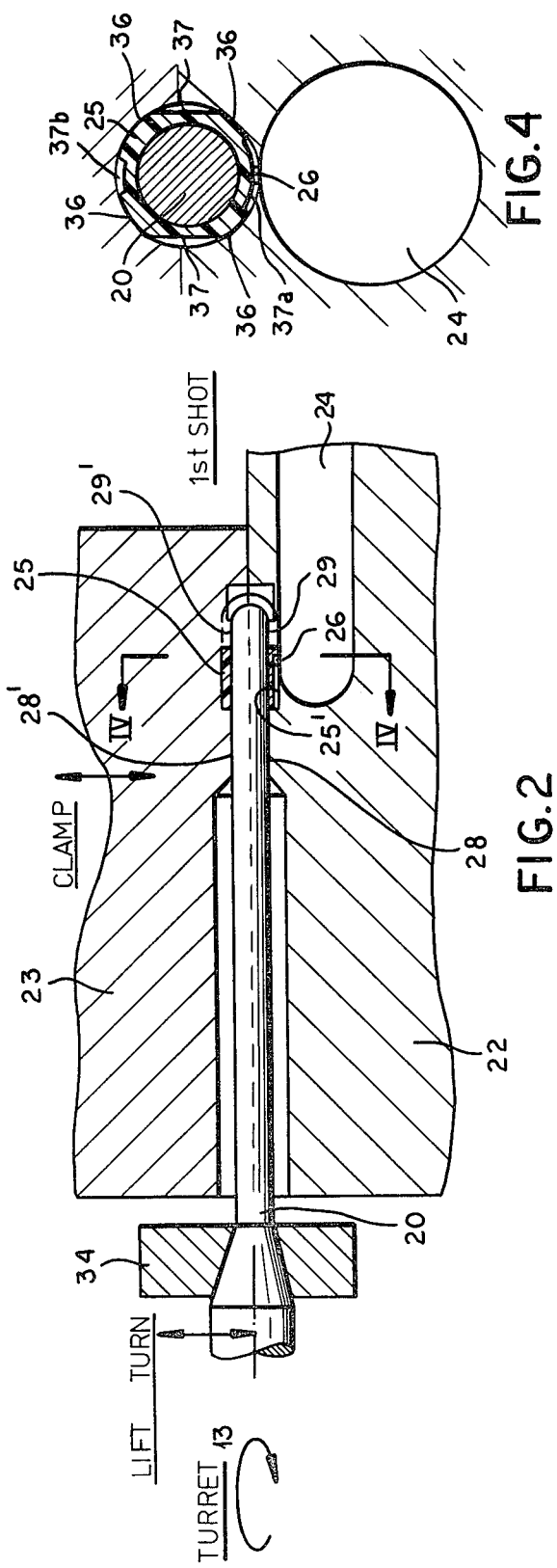
FIG. 2 is a sectional view through a first mold cavity traversed by a core.

Attention is now directed to FIG. 2, which is a vertical sectional view taken through the right-hand injection system 11 of FIG. 1 substantially in an axial plane of one of the cores 20. In this Figure the lower mold half 22 is stationary and has a channel 24 feeding molten plastic to a first-shot cavity 25'. The upper mold half is identified by the numeral 23. Through a gate 26, molten plastic passes from the supply channel 24 to the cavity 25' defined between the halves 22 and 23. Specifically, this first mold cavity has an axial dimension which is only a fraction of the total length of the core 20 partly extending through the cavity. Because of the relatively short axial dimension of cavity 25', and the fact that the core 20 is securely supported at both ends of this cavity, only negligible core displacement will take place upon injecting molten plastic into cavity 25' in order to form an annular spacer element 25 against the part of the core 20 traversing same. The core 20 is firmly supported by both cavity halves 22 and 23 which define clamping jaws with semicylindrical surfaces 28, 28' and 29, 29'.

The mold defined by the halves 22 and 23 then opens. In the apparatus illustrated, the upper mold half 23 will rise as the lower stationary half 22 remains in position. The turret 13 which supports the core 20 will also rise at the same time, though to a lesser extent, in order to free the cores on which the spacer elements 25 have been molded.

Figure 4:
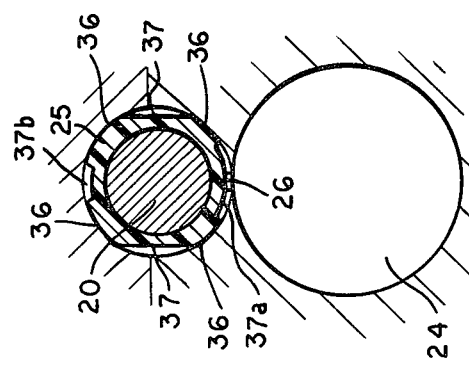
FIG. 4 is a cross-sectional view taken on the line IV—IV of FIG. 2.

Attention is next directed to FIG. 4 which shows, on a larger scale, a cross-sectional view of core 20 and ring 25; the supply channel 24 is represented by a simple circle. The gate 26 leading to cavity 25' is also visible. The spacer element 25 can be seen in FIG. 4 to be a substantially cylindrical ring or band having a number of peripheral recesses formed by corresponding discontinuities in the generally annular cavity 25'. More specifically, the spacer 25 includes two flats 37, which make it possible to separate the cavity halves 22 and 23 without tearing the spacer apart, and two longitudinal grooves 37a, 37b bounded by lateral walls. The gate 26 is located centrally within the larger bottom groove 37a.

Figure 3:
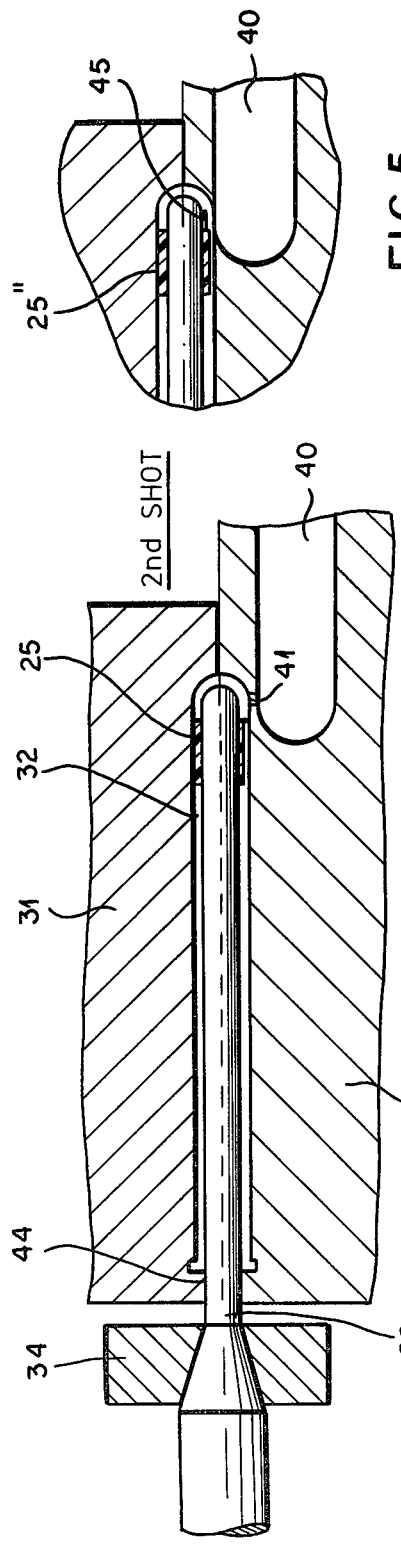
FIG. 3 is a sectional view through a second mold cavity into which the core extends.

FIG. 3 represents a vertical sectional view through two mold halves 30 and 31 associated with the second injection system 12 of FIG. 1. These mold halves 30 and 31 define a second-shot cavity 32 which is the final mold shape and from which the ultimate workpiece will be taken. In the case of FIG. 3 that workpiece is a test tube with a closed, rounded right-hand end and a flange on its open left-hand end. As can be clearly seen, the spacing ring 25 fits snugly within the second-shot mold cavity 32, and its position close to the right-hand, cantilevered end of the core 20 will lend sufficient support to the core to prevent any significant displacement thereof due to plastic pressure. It will be understood that the spacer 25 will have solidified by the time it is placed within the cavity 32, and thus will be stiff enough to accomplish its supporting function before merging into the molded workpiece.

In FIG. 3 a supply channel 40 passes molten plastic through a gate 41 into the cavity 32 to the right of the spacer 25. It will now be appreciated that the purpose of the various peripheral recesses 37, 37a and 37b in the outer surface of spacer 25 is to permit the molten plastic from the supply channel 40 to pass by the spacer toward the left-hand end of the cavity 32. It will also be apparent that air-venting is no problem in the arrangement of FIG. 3 since the plastic flows along the core to an area at the wider cavity end where vents 44 can be easily accommodated without affecting the workpiece.

After the second injection, the mold clamp 10 again rises, carrying the upper mold half 31 upward. At the same time, the turret rises to a lesser extent to raise the cores 20 clear of the lower mold half 30. The turret 13 then rotates again to its third position, shown at lower left in FIG. 1, from which the molded workpieces 42 can be ejected by advancing a stripper plate 34. all three operations (the first injection, the second injection and the ejection or stripping) take place simultaneously, three times for each full rotation of the turret.

Although the spacer 25 has been shown as entirely encircling the core 20, it will be appreciated that certain designs may permit a split ring to be utilized which almost but not quite encircles the core and forms a passage for the plastic flow.

In FIG. 1, three stations are shown for the three-position turret 13. I consider three stations the minimum that would be required; four or more stations could be provided in order to accommodate an extra cooling station before ejection, or for faster cycling. Also, the fourth or additional station could be used for stamping, decorating, inspecting, etc.

It will also be appreciated that, instead of hot-runner edge-gating as shown in FIGS. 2 and 3, the workpieces could be plainly hot-runnered or valve-gated into the sides or supplied from cold runners, either in the parting line of the mold halves or with a pin-point gate in a three-plate mold.

Figure 5:
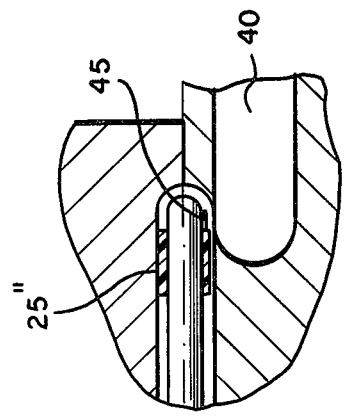
FIG. 5 shows a modification of the arrangement of FIG. 2.

In FIG. 5 I have shown a spacer 25" which is similar to the ring or band 25 of FIGS. 2–4 but which has a short extension runner 45 to allow a shortening of the nozzle of the hot-runner supply channel 24 used for the first shot.

Although a test tube has been shown as the molded workpiece in FIGS. 1–5, it will be understood that a pipette or hypodermic (with an open end) or any slender article, not necessarily round, can be produced. For example, it may be required to mold a very flat workpiece for which the core would have a very small dimension in one direction. This would make core deflection a serious problem and could also present considerable difficulties for cooling the inside of the core. In such a situation, a spacer element formed in the manner described with respect to FIGS. 1–5 would be of advantage. Also, a fourth station for cooling the core externally would be very useful to achieve a good molding cycle.

Figure 6:
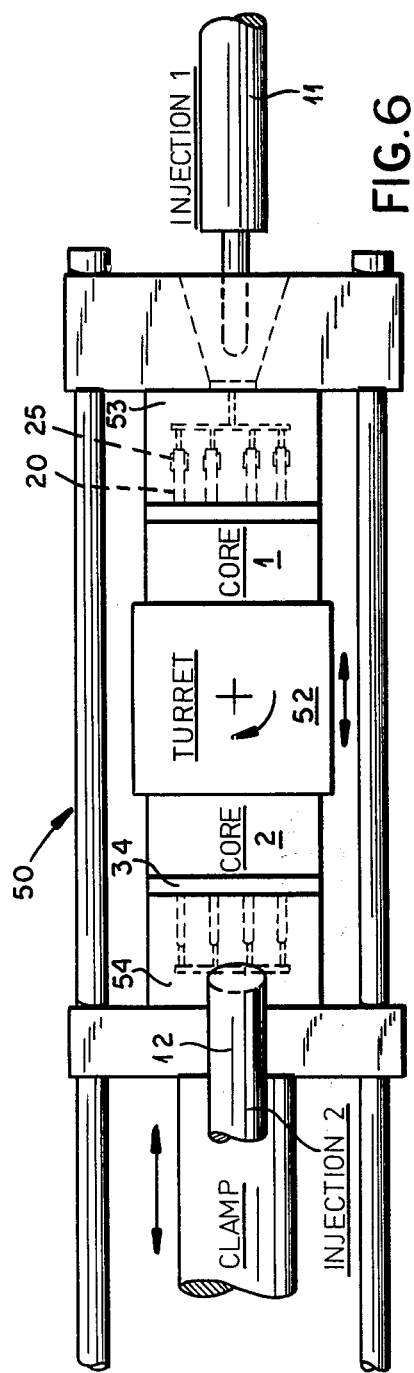
FIG. 6 is a plan view of a portion of an injection-molding machine equipped with a turret and adapted to carry out the method of my invention.
Figure 7:
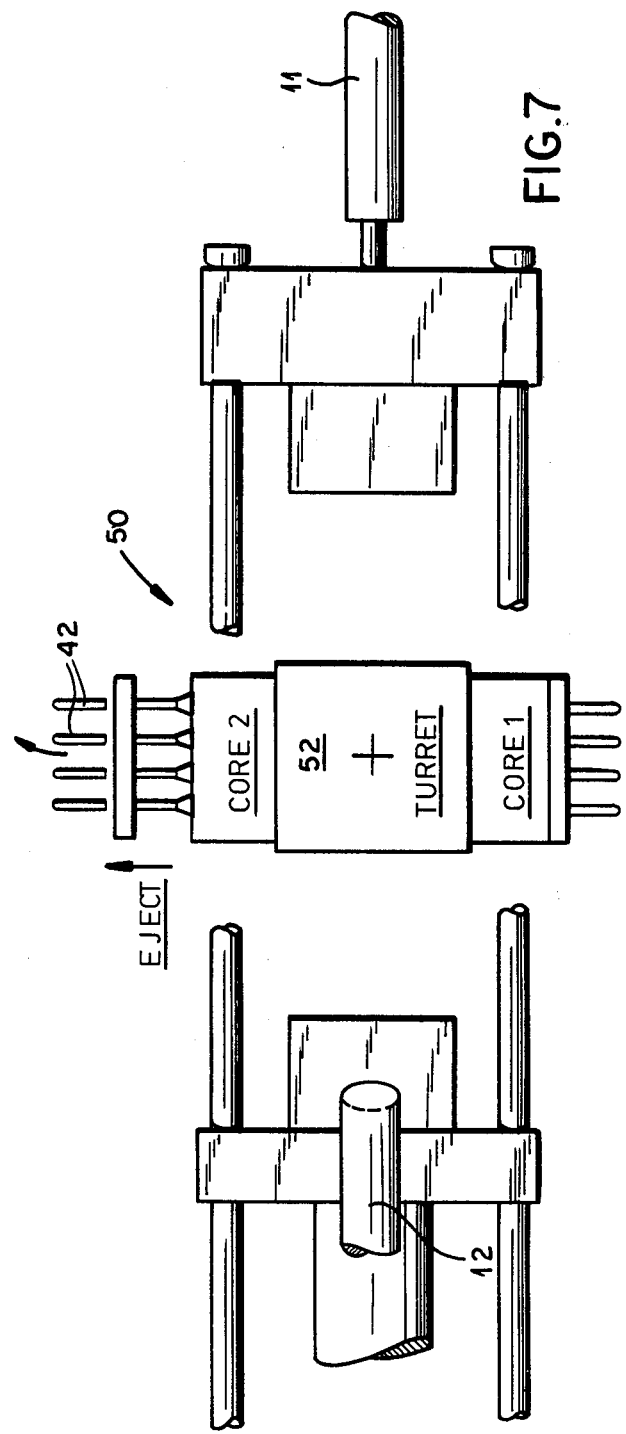
FIG. 7 is a plan view of an injection-molding machine similar to that of FIG. 6, showing an alternative operational sequence.
Figure 8:
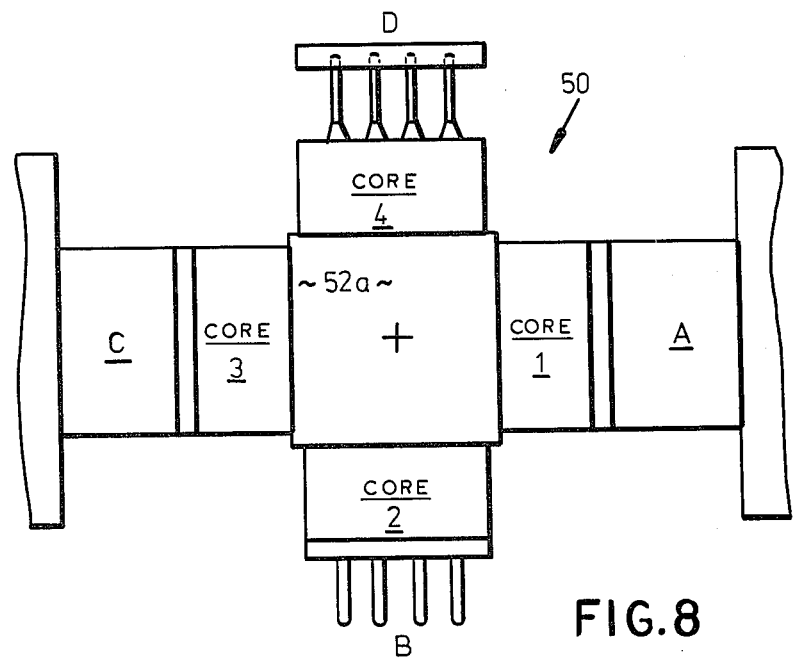
FIG. 8 is a plan view of a variant showing a turret with four stations.

FIGS. 6, 7 and 8 illustrate the use of a turret which has two or four stop positions and which can be used, if desired, for a two-material molding procedure. A typical two-material machine is described in commonly owned U.S. Pat. No. 4,243,362 issued Jan. 6, 1981 to Rees and Nevrela.

In FIGS. 6 and 7 a conventional injection-molding machine 50 is equipped with a turret 52 and two distinct injection systems 11 and 12. A first injection takes place from system 11 into a first-shot cavity to mold a spacer element 25 around each core 20. The mold then opens fully, and the turret which carries the cores 20 moves in the same direction but only part of the way, i.e. far enough to permit its rotation without causing the cores 20 and the spacer element 25 to collide with the cavity-defining portions. The cavity proper is formed by two split sections equivalent to the two mold halves 22 and 23 in the previously described system. These sections are guided in a block 53 and are forced by springs or air pressure to follow the retraction of the cores from the cavity for a limited distance.

The mold halves are guided by diverging tracks or pins which let them move apart from each other as they leave their support in the block 53, the movement being enough to clear a path for the spacer 25 on each core 20 by the time the split halves arrive at the limit of their outward travel. This method is commonly used in the molding industry for workpieces with undercuts which would otherwise be impossible to remove from the cavity.

When the cores 20 are fully withdrawn, the turret 52 rotates through 180° to align the cores with the second-shot mold. As the mold closes, the cores enter into the set of cavities provided for the second shot.

It will be understood that the second-shot mold need not be split similarly to the first-shot mold. However, the second mold could be split if, for example, there were an insufficient draft angle to withdraw the final workpiece without damage or if external configurations are to be molded onto the workpiece such as lettering, graduations or the like.

After the second injection, the mold opens again and the workpieces can be ejected by advancing the stripper plate 34, either before the turret starts turning or during its rotation back to the first injection station. It will be evident that the two injection cycles take place simultaneously, so that every time the clamp opens, one set of finished workpieces is ejected.

In FIG. 7 the turret 52 is shown in the 90° position for workpiece ejection. This arrangement is especially useful if the workpieces are to be ejected into special receptacles to maintain orientation and/or separation thereof by cavity, for quality control, or in case workpieces of different configurations are produced in one mold.

FIG. 8 shows a similar system wherein, however, a turret 52a sequentially rotatable through four stations A–D is equipped with four sets of cores. Station A can be used for the first injection (i.e. the provision of the spacer element), station B can be used for additional cooling, station C can be used for the second injection (i.e. completion of the workpieces) and station D can be used for ejection. The system shown in FIG. 8 would be especially useful in cases where internal core cooling with fluids is difficult on account of the size or shape of the cores. While this may not be an ideal solution, the halt in stations B and D can be used to direct cool air against the cores to keep them at an acceptable mean temperature, despite repeated injection of hot plastic.

Figure 9:
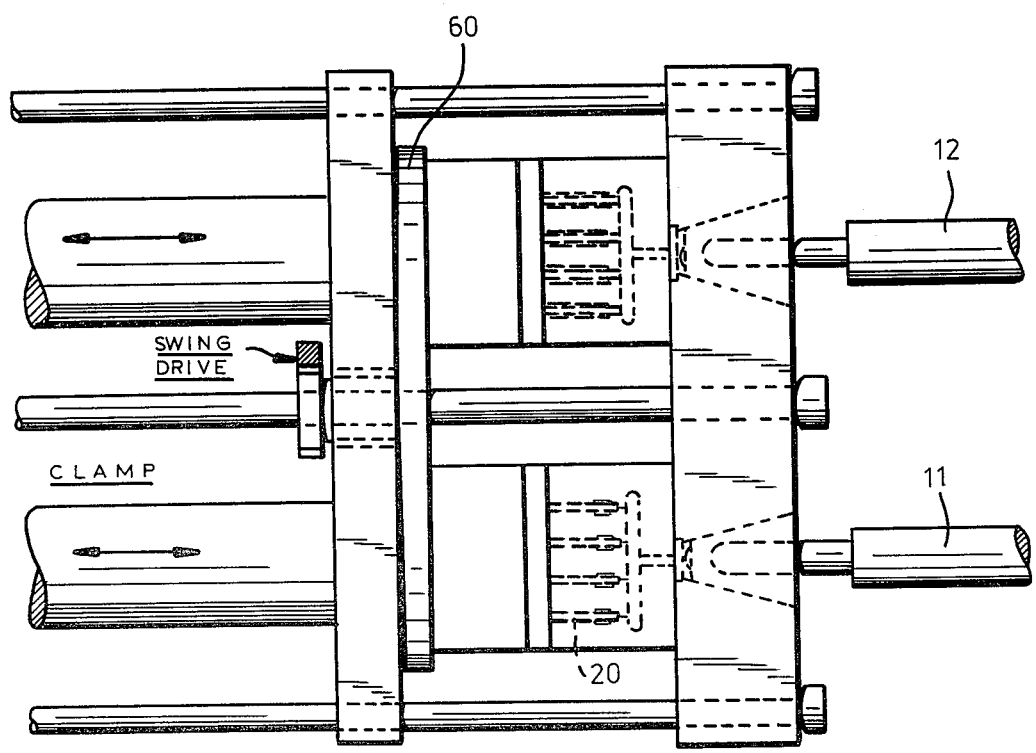
FIG. 9 is a plan view of an injection-molding machine adapted to inject two different plastics into respective cavities.

FIG. 9 shows a further embodiment, using a two-color machine such as that described in commonly owned U.S. Pat. No. 3,482,284 issued Dec. 9, 1969 to Rees, or in similar machines where the injection systems are both on the same side, opposite the clamping mechanism.

In FIG. 9, in place of a turret, a rotating or oscillating mold carrier 60 supports two identical core halves, each with a set of cores 20. The cavity halves are substantially the same as those for the mold used in a turret system. In the illustrated system two sets of cores are considered practical, although four sets would be feasible. The ejection of the completed workpieces is to be carried out before turning the plate 60 or during its rotation. Random ejection would be relatively simple, but take-offs such as those described in commonly owned U.S. Pat. No. 3,454,991 (Rees) would be feasible for the removal of workpieces in an oriented manner.

With the turret systems shown in FIGS. 6–8 it will be understood that ejection would be accomplished by hydraulic cylinders or the like located under the stripper plate 34. The hydraulic supply could enter through the central shaft of the turret, and individual valves (not shown) operated by cams during the rotation of the turret would direct the hydraulic pressure to the particular cylinder which is to act. Reference may be had to an analogous system shown in U.S. Pat. No. 2,333,056, issued Oct. 26, 1943 to R. Thoreson et al.

The system of FIG. 9 could have an ejection control similar to that just described, or a conventional ejection system acting only on the core half which is in the ejection mode. This mode of ejection would be practical if accomplished before rotation of the plate 60.

FIG. 10 shows a first-shot mold including a unitary block 53a in which halves 22a and 23a of a split mold portion are locked by tapering surfaces 22' and 23', respectively, in a clamping position. Block 53a forms a socket 65 which receives the tip of core 20 and opens into an inwardly converging throat mating with the tapering mold halves 22a and 23a. The first mold cavity may be designed to form a spacer element having an annular body 25a with four recesses 37a, as shown in FIG. 11, and with a rearward extension giving access to these recesses, such as a looped runner 81. Other configurations will be described subsequently with reference to FIGS. 10a–10f.

As the mold opens, the core 20 withdraws leftward along with the spacer 25a and the mold sections 22a, 23a follow the core 20 for a short distance on nonillustrated guides. Sections 22a and 23a move leftward over a distance x in the axial direction and separate laterally by a distance y at right angles to the direction x, thus freeing the ring face shown at 61 in FIG. 10.

The cavity forming the spacer 25a is linked with the vertex of socket 65 by one or more runner-forming passages, e.g. a shallow clearance (FIG. 10b) or depressions of limited width (FIG. 10e). A valve gate 62 with a valve pin 63 is also shown in FIG. 10, although a simple system using an open gate which freezes after injection could be used instead; another possibility is pin-point gating from a cold-runner system (three-plate mold).

As illustrated in FIG. 10 by phantom lines 64, the mold halves 22a, 23a could be extended to define the cavity for the forming of the spacer element 25a upon their introduction into the correspondingly extended converging throat of block 53a. This could have some manufacturing advantages or could help withdraw the ring 25a from the mold in case there is a risk that the ring might stick within the cavity block 53a.

FIGS. 10a, 10b and 10c show cross-sections of core 20 and ring 25a taken in different transverse planes Xa—Xa, Xb—Xb and Xc—Xc as noted above. As can be seen from FIGS. 10 and 10b, the closed end of the workpiece is molded on the core with the first injection to form a thin-walled cap 81a as a runner designed to facilitate the flow of plastic during the second injection. The view of ring 25a in FIG. 10 is taken on the line X—X of FIG. 10a. A variant shown in FIGS. 10d, 10e and 10f is similar to that just described, except that four separate runners 81b connect the gate 62 with the spacer 25a to form two crossed loops, one of them corresponding to the tail 81 of FIG. 11. FIG. 12 illustrates in enlarged longitudinal sectional view a part of the spacer 25a and a portion of a runner, showing a beveled shoulder angled at 30° and a draft angle of $\frac{1}{4}$° which would typically be found on the outside of such a part to facilitate entering the ring into the second-shot cavity if the latter is not split.

Figure 13:
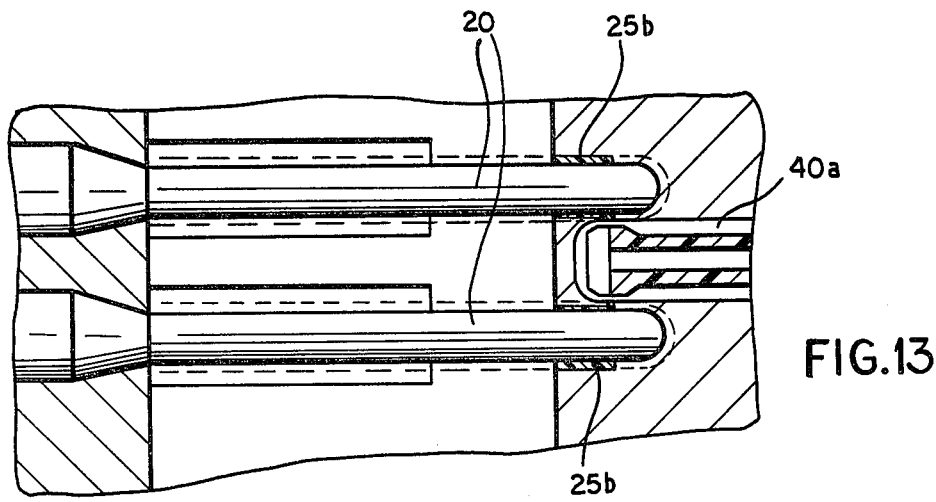
FIG. 13 is a longitudinal sectional view of a mold structure with two first-shot cavities fed from a single plastic supply.

Attention is now directed to FIG. 13 which shows a system similar to that of FIG. 10, except that a single supply channel 40a feeds plastic into two spacer elements 25b encircling two parallel cores 20. An advantage of this arrangement is that only one half the number of nozzles is required. The injection preferably takes place into a thinner section of each spacer 25b which forms one of the grooves 37a (FIG. 11) facilitating the second-shot flow, so that any projection left over from the first injection could disappear during the second shot. In FIG. 13 the parting line separating the two mold halves is in the plane of the paper, while in FIG. 10 the parting line (indicated at P/L in FIG. 10d) lies at right angles to the paper.

Figure 14:
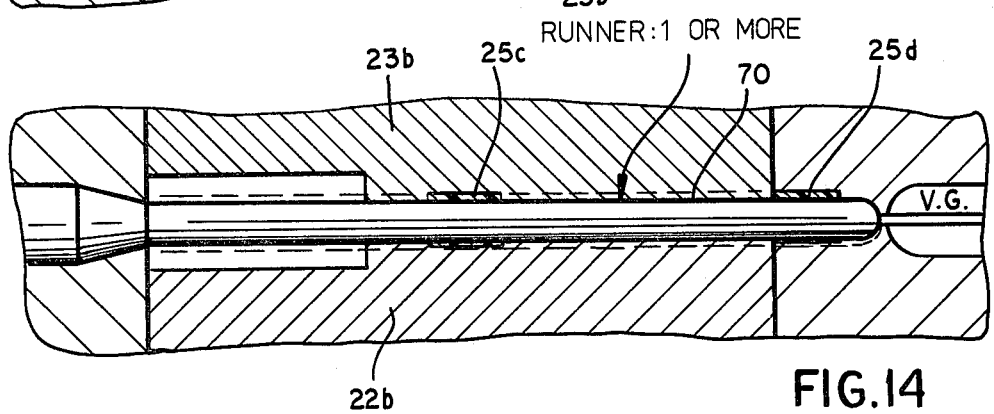
FIG. 14 illustrates, in a view similar to FIG. 13, a plurality of spacer rings on a single core of greater-than-average length.

FIG. 14 illustrates a split mold with three pairs of axially separated clamping jaws defining cavities for two annular spacers 25c and 25d, the spacer 25c being located completely inside the mold halves 22b and 23b. A channel 70 for a runner is cut into the upper half 23b and supplies plastic to the spacer 25c in the left-hand cavity. It will be understood that even more rings could be formed to support very slender and elongated cores.

FIG. 15 shows a second-shot cavity 72 which is not split. The core 20 along with the spacer 25d enters the cavity 72 when the mold is closing. The second injection, which completes the workpiece, takes place either through an axial channel 74 closable by a pin 75, disposed at the vertex of the cavity section to the left of the spacer, or alternatively through a side channel 76 accessing this cavity section through a gate 77.

In FIG. 16 I have shown an arrangement similar to that of FIG. 15 which utilizes a mold split into two halves 22c and 23c.

FIG. 17 illustrates a split mold with two halves 22d and 23d having cavities to form two spacer elements 25e and 25f.

Figure 18:
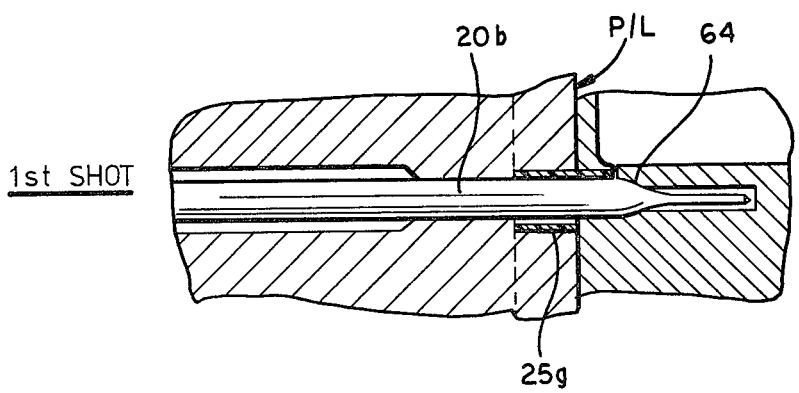
FIGS. 18 and 19 are longitudinal sectional views illustrating respective mold shapes for the molding of a pipette.
Figure 19:
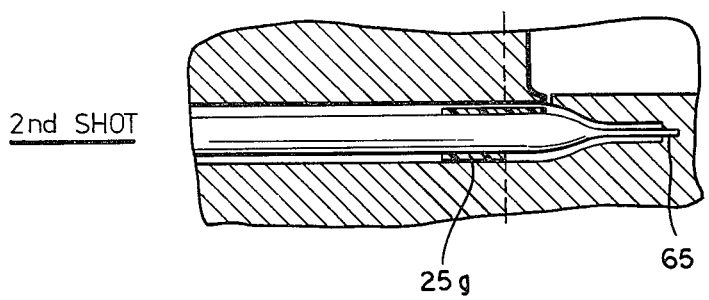

FIGS. 18 and 19 show a typical mold for pipettes. Since gating into the tip is impractical, the mold illustrated uses hot-runner edge-gating. In the first shot, as shown in FIG. 18, the core 20b is well supported both in the mold halves and in the cavity itself at 64 during formation of a spacer ring 25g. In the second shot, as shown in FIG. 19, the spacer 25g supports the core. A small tip of the core which forms the pipette opening is shown entering the cavity at 66, although this is not an essential requirement.

Attention is now directed to FIGS. 20a–20f for a description of a further embodiment of my invention. The arrangement shown in these Figures is particularly suitable for molding exceptionally long and slender parts, such as pipettes. A typical pipette might be approximately 300 mm long with an inside diameter of about 8 mm, thus having a length-to-diameter ratio of nearly 40:1. At the present time, it is impossible to produce such a part other than by assembling a cut-to-length piece of extruded tubing with an injection-molded tip, these two parts being bonded together by applying a suitable adhesive. A third operation is then necessary in order to print the graduations onto the tubing.

In the method now to be disclosed with reference to FIGS. 20a–20f, a pipette of the kind just described can be integrally molded, complete with graduations.

A conventional molding machine can be used for the mold shown in FIGS. 20a–20f, having a single injection system. With such a machine a single type of plastic material can be injected in both the first and the second shot.

Figure 20A:
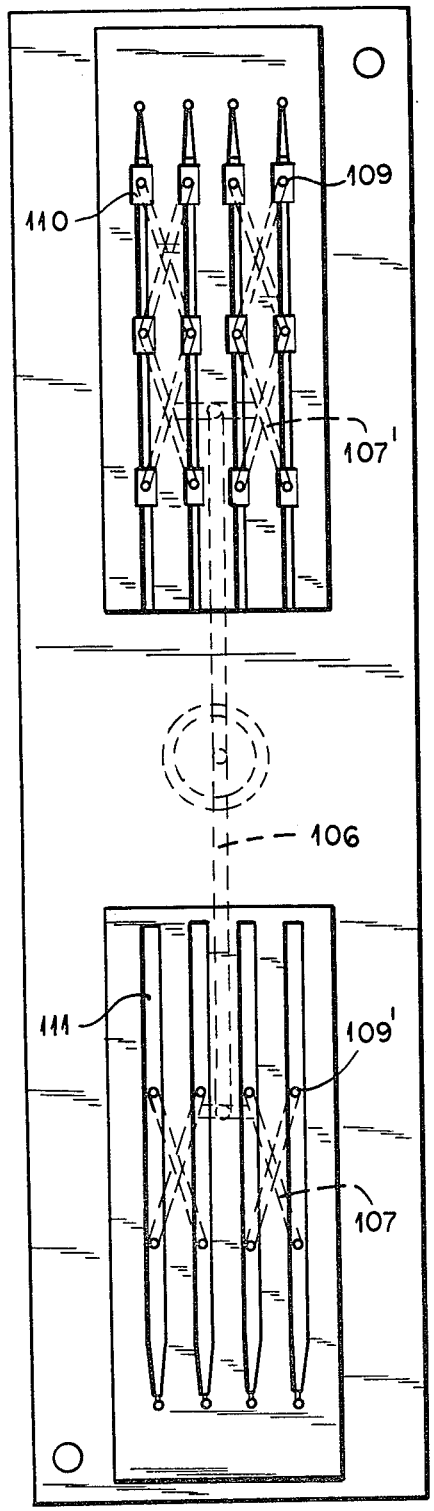
FIG. 20a is a face view of the injection side of a mold for the molding of four pipettes.
Figure 20B:
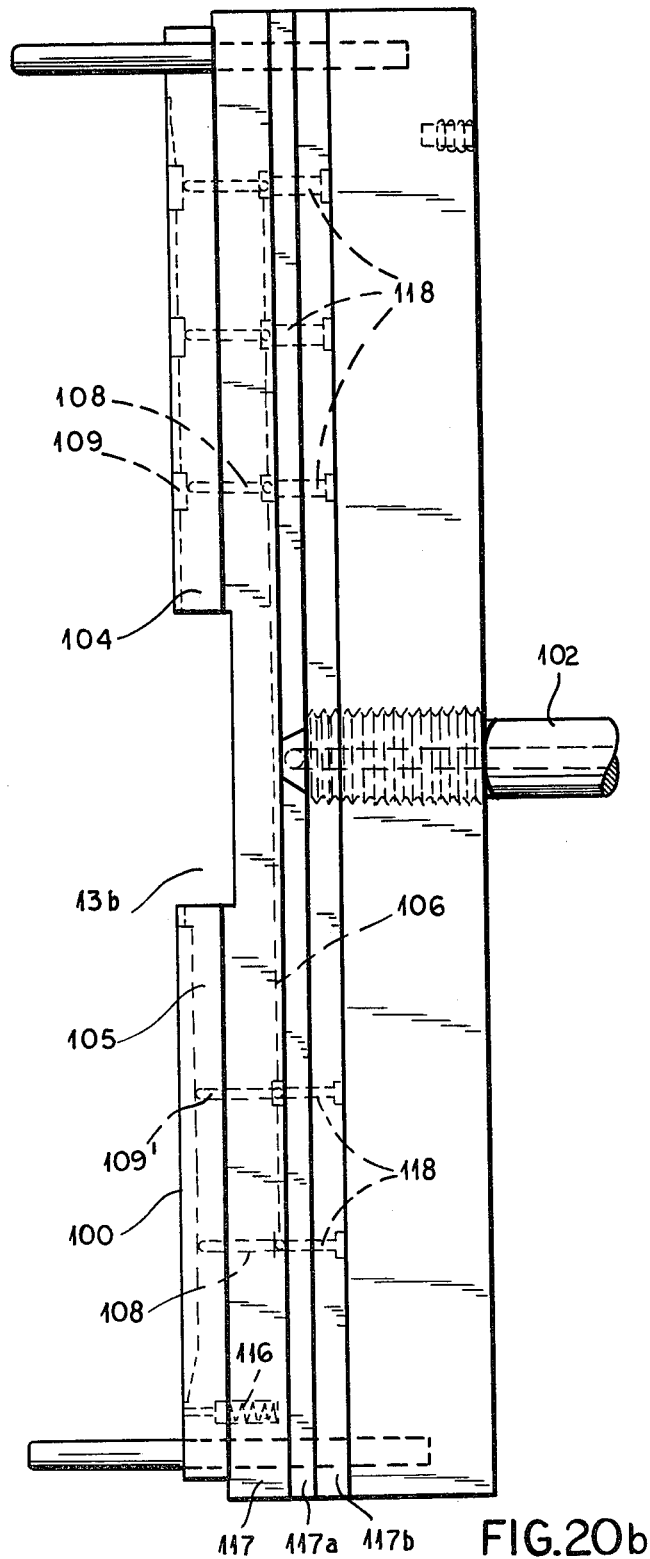

In FIGS. 20a and 20b, the numeral 102 identifies the molding-machine nozzle which supplies plastic to a runner system including distributing passages 106, 107 and 107'. Passageways 108, known as "drops", supply plastic from the runner system through pin gates 109, 109' into first-shot cavities 110, in which the spacer elements are molded, and second-shot cavities 111 for completing the workpieces. In FIGS. 20a and 20b there are shown one "drop" for each spacer element and two "drops" for each pipette. Depending upon the design, a single "drop" could suffice for each pipette, or alternatively more than two could be used if required, for example in the case of exceptionally long pipettes.

Figure 20C:
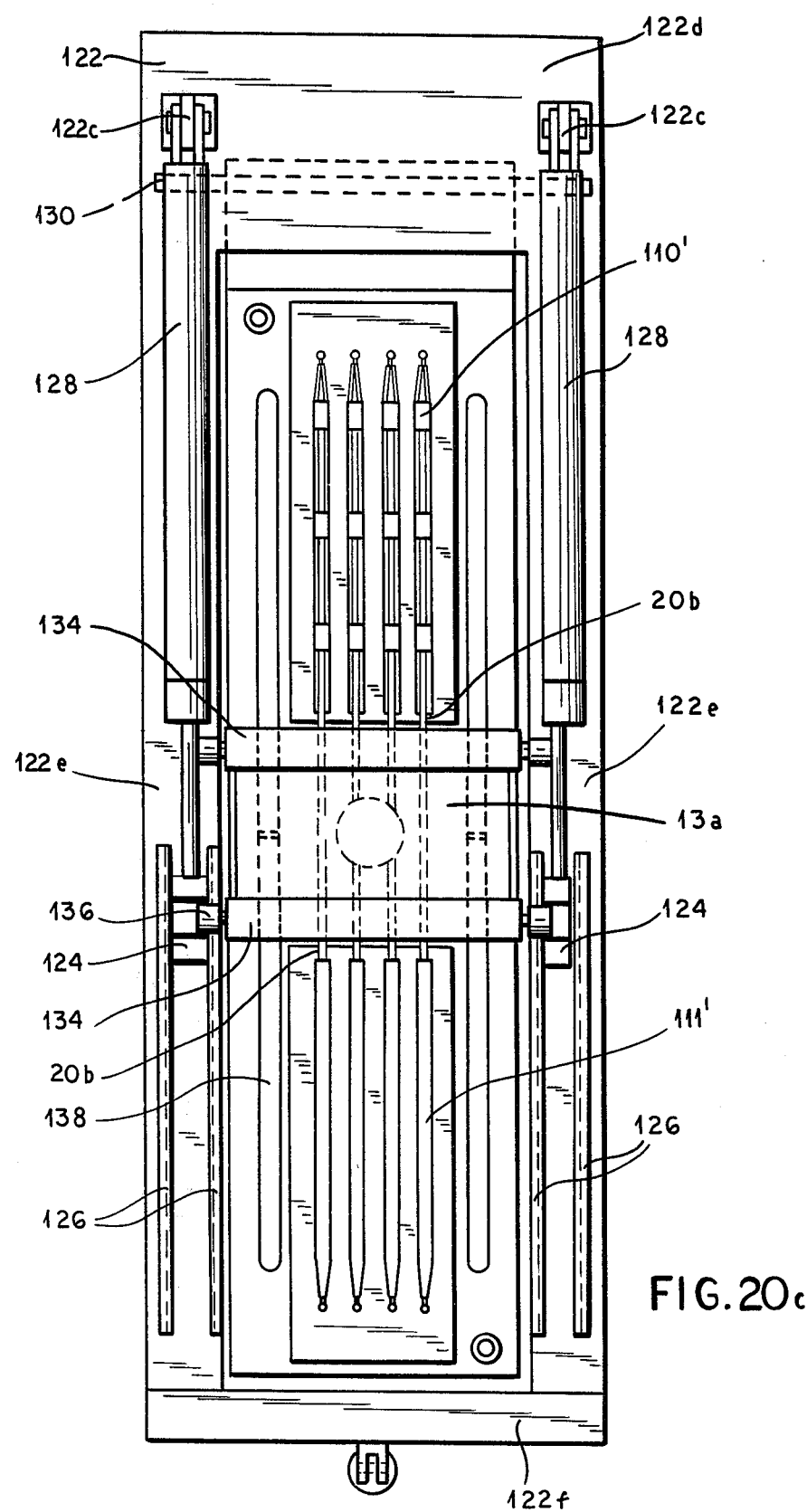
FIG. 20c is a face view of the ejection side of the same mold, including a rotating core carrier.
Figure 20D:
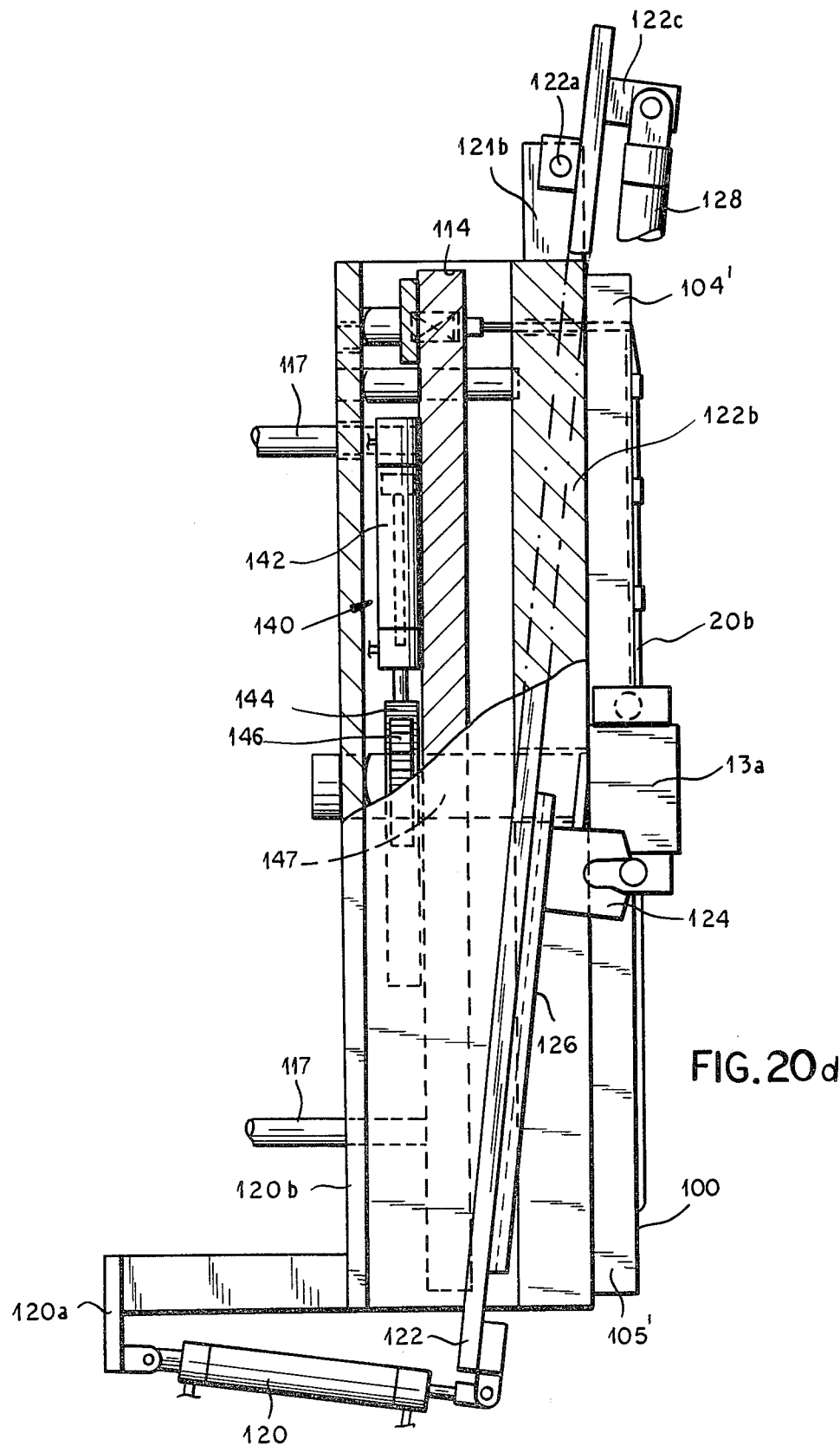
FIG. 20d is a partially sectioned elevational view through the ejection side of the mold shown in FIGS. 20a–20c.

FIGS. 20c and 20d show the ejection side of the mold, which includes a turret or core carrier 13a that fits within a clearance 13b facing the injection nozzle 102 shown in FIGS. 20a and 20b. A plurality of cores 20b project in two groups of four from opposite sides of the turret 13a and are adapted to lodge in respective cavity blocks 104, 104' and 105, 105'. The free or distal ends of the cores 20b, remote from the turret 13a, are adapted to be lodged in and firmly held by appropriately shaped portions of the mold cavities in the cavity blocks 105 and 105'.

As shown in FIG. 20e, the turret 13a can be moved away from the ejection portion of the mold, by a distance sufficient to let the turret rotate without having the cores or any plastic portions molded thereon come into mechanical interference with any part of that mold portion. To assist in freeing the molded workpieces from the mold cavities, spring-loaded pins 116 and 116' are provided adjacent the free ends of the cores and at some distance from the molding region.

As seen in FIGS. 20b and 20f, the injection side of the mold includes a conventional three-plate system with a first plate 117, a second plate 117a and a third plate 117b. FIG. 20b makes it clear that the distributing passages are located at the interface between plates 117 and 117a, and that the "drops" 108 extend through the plate 117 and the cavity blocks 104 and 105. A plurality of pin elements 118, anchored to the right-hand side of plate 117b and having undercut portions lodged within the solidified plastic at the head of each "drop" 108, allow cold runners 113 with branches 108a to be extracted and severed from the molded workpieces (the severance taking place at the pin gates), whereupon separation of plates 117a and 117b pulls the pin elements 118 out of the hardened plastic constituting the cold runner 113 and its branches 108a which may then fall away from the mold, to be used for scrap or regrinding. The mechanism for the operation of a three-plate system as shown in FIGS. 20b and 20f is conventional and does not need to be described in detail.

In FIG. 20e a machine ejector 117c (of which there may be several) is adapted to advance a plate 114 which supports the spring-loaded ejectors 116' serving to free the cores from the cavities at the ejection side. The spring-loaded ejectors 116' must stay back in the fully advanced position of the plate 114 in order to permit removal of the finished workpieces from the cores, as will appear subsequently.

As shown in FIGS. 20c and 20d, an air cylinder 120 is mounted between a bracket 120a, secured to a plate 120b forming part of the ejector portion, and the end of a plate 122 which is swingable about a pivot 122a on a bracket 121b fixed to another plate 122b.

Two brackets 122c support the ends of two hydraulic cylinders 128 whose pistons are connected to forks 124 which are slidably mounted on the plate 122 by means of guides 126.

It will be noted that the plate 122 consists of a head portion 122d and two parallel arms 122e which support the guides 126. A lower portion 122f bridges the ends of the arms 122e. A cutout existing between the arms 122e accommodates the ejection side of the mold and permits the plate to swivel past the ejector side to a retracted position shown in FIG. 20d.

Turret 13a is flanked by two stripper plates 134 which are adapted to slide along the cores 20b and to strip the finished workpieces therefrom. Mounted adjacent each end of each stripper plate 134 is a roller 136 (four rollers in all) which can be engaged by the forks 124 when the various pieces are in the appropriate position, as will shortly be explained.

As seen in FIG. 20d, a swing drive 140 for the turret 13a includes an air cylinder 142 designed to reciprocate a rack 144 in order to turn a pinion 146 through 180°, the pinion 146 being connected by way of a shaft 147 to the turret 13a.

In operation, the mold is first closed, with the assemblies of FIGS. 20b and 20d meeting at a parting line 100. The cores 20b are then lodged in their respective cavity blocks 104, 104' and 105, 105'. Plastic is supplied through the machine nozzle 102 and the runner system previously described. The plastic then enters the cavities 110, 110' in order to form the spacer elements. It will be understood that, in a previous cycle, identical spacer elements were formed on the cores which in FIG. 20c extend downward from the turret 13a. Thus, the injection of plastic into the runner system will now provide the finishing amount of plastic needed to complete the pipettes in cavities 111, 111'.

The mold now opens and reaches the position shown in FIGS. 20e and 20f. In FIG. 20e the air cylinder 120 has been actuated to move the plate 122 into a position in which the forks 124 engage the two rollers 136 located on the lower stripper plate 134 as viewed in FIG. 20c. In order for this engagement to take place, the pistons of the hydraulic cylinders 128 are in their retracted positions as seen in FIG. 20c. Now, the hydraulic cylinders 128 are actuated to push the forks 124 and thus the lower stripper plate 134 downward and away from the turret 13a, thereby removing the four lower pipettes from their respective cores 20b.

As soon as the parts have been ejected, the hydraulic cylinders 128 reverse their action to pull the stripper plate 134 back to the molding position. Subsequently, the plate 122 is returned to its retracted position shown in FIG. 20d, by reversing the action of the cylinder 120. As soon as the forks 124 have been disengaged from the rollers 136, the swing drive is operated to rotate the turret 13a, thereby interchanging the positions of the sets of cores 20b so that the spacer elements previously formed in the upper part of the mold shown in FIG. 20c now are located in the lower cavities 111, 111' while empty cores 20b are located adjacent the cavities 110, 110' designed to mold the next set of spacer elements.

As the mold recloses for the next injection cycle, the ejector plate 114 returns and the three-plate mechanism again closes.

It should be understood that other means are available for rotating the turret. For simplicity of illustration, cooling channels for the cavities have been omitted in FIGS. 20a–20f.

I claim:

1. A method of injection-molding an elongate hollow workpiece of plastic material, comprising the steps of:
    (a) introducing an elongate core, having one end fixedly secured to a support, into a first mold portion having clamping surfaces engageable with said core and defining at least one generally annular first-shot cavity with at least one peripheral discontinuity encircling said core in the vicinity of an opposite, free end thereof upon closure of said clamping surfaces around said core;
    (b) upon engagement of said core by said clamping surfaces, injecting plastic material into said first-shot cavity to form a generally annular spacer with at least one peripheral recess corresponding to said discontinuity;
    (c) upon disengagement of said clamping surfaces from said core and hardening of said spacer, introducing said core into a second mold portion with a second-shot cavity, of greater length than said first-hot cavity, longitudinally divided by said spacer into one section surrounding said free end and another section communicating with said one section via said peripheral recess;
    (d) injecting plastic material into said one section and thence via said peripheral recess into the remainder of said second-shot cavity;
    (e) allowing the plastic material last injected to harden around said core into a finished workpiece incorporating said spacer; and
    (f) stripping said finished workpiece from said core.

2. The method defined in claim 1 wherein the injection in step (d) is carried out at a vertex of said one section confronting said free end.

3. The method defined in claim 1 or 2 wherein the injection in step (b) takes place at a location opposite said free end through a gap offset from said discontinuity extending from said location to said first-shot cavity, thereby forming a runner incorporated into the finished workpiece in step (e).

4. The method defined in claim 3 wherein said peripheral recess is one of several angularly equispaced longitudinal grooves angularly offset from said runner.

5. An apparatus for injection-molding an elongate hollow workpiece of plastic material, comprising:
- a support provided with an elongate core fixedly projecting therefrom and terminating in a free end remote from said support;
- first mold means having clamping jaws engageable with said core in a closure position for defining at least one generally annular first-shot cavity with at least one peripheral discontinuity encircling said core in the vicinity of said free end;
- first injection means operable in said closure position to introduce plastic material into said first-shot cavity to form a generally annular spacer with at least one peripheral recess corresponding to said discontinuity;
- second mold means juxtaposable with said support in place of said first mold means upon a hardening of said spacer for receiving said core in a second-shot cavity, of greater length than said first-shot cavity, longitudinally divided by said spacer into one section surrounding said free end and another section communicating with said one section via said peripheral recess;
- second injection means connected with said second mold means for introducing plastic material into said one section and thence via said peripheral recess into the remainder of said second-shot cavity; and
- ejection means operable, upon a hardening of the last-injected material into a workpiece incorporating said spacer and extraction of said core from said second-shot cavity, to strip said workpiece from said core.

6. An apparatus as defined in claim 5 wherein said first mold means comprises two separable mold halves forming said clamping jaws.

7. An apparatus as defined in claim 6 wherein one of said mold halves has a supply channel communicating with said first injection means.

8. An apparatus as defined in claim 6 wherein said first mold means further comprises a unitary block defining said first-shot cavity with said separable mold halves, said first injection means terminating at a socket of said block adapted to receive said free end.

9. An apparatus as defined in claim 8 wherein said block has a throat converging toward said socket for holding said separable mold halves together upon introduction thereof jointly with said core into said throat.

10. An apparatus as defined in claim 8 wherein said separable mold halves jointly define another generally annular first-shot cavity with at least one peripheral discontinuity at a location remote from said block, the two first-shot cavities being linked by a runner channel open toward said core in at least one of said mold halves.

11. An apparatus as defined in claim 8 or 9 wherein said first injection means terminates at a gate confronting said free end and communicating with said first-shot cavity via a passage in said socket offset from said discontinuity and open toward said core.

12. An apparatus as defined in claim 11 wherein said passage is an all-around clearance with an outer radius less than that of said first-shot cavity.

13. An apparatus as defined in claim 11 wherein said passage is a depression of limited width.

14. An apparatus as defined in claim 6 wherein said second mold means is split into two mold halves defining said second-shot cavity.

15. An apparatus as defined in claim 14 wherein the mold halves of said first and second mold means are mounted on two relatively displaceable carriers, said support being movable for alternately positioning said core between the mold halves of said first mold means and said second mold means upon relative separation of said carriers.

16. An apparatus as defined in claim 15 wherein said first and second injection means comprise respective branches of a common runner system.

17. An apparatus as defined in claim 15 or 16 wherein said support comprises a turret rotatable between a first injection position, in which said core lies between the mold halves of said first mold means, and a second injection position, in which said core lies between the mold halves of said second mold means.

18. An apparatus as defined in claim 17 wherein said turret carries another core lying between the mold halves of said first mold means in said second injection position and between the mold halves of said second mold means in said first injection position, said first and second injection means being operable simultaneously for producing a spacer on one core and a finished workpiece on the other core upon concurrent closure of said first and second mold means by a relative motion of said carriers toward each other.

19. An apparatus as defined in claim 18 wherein said ejection means comprises a pair of stripper plates on said turret alternately displaceable to remove a finished workpiece from a respective core.

20. An apparatus as defined in claim 19 wherein one of said carriers is provided with guide means engageable upon mold closure with the stripper plate facing said second mold means.

* * * * *